Aug. 24, 1943.   H. B. DRAPEAU   2,327,342
COOLING SYSTEM
Filed May 2, 1939
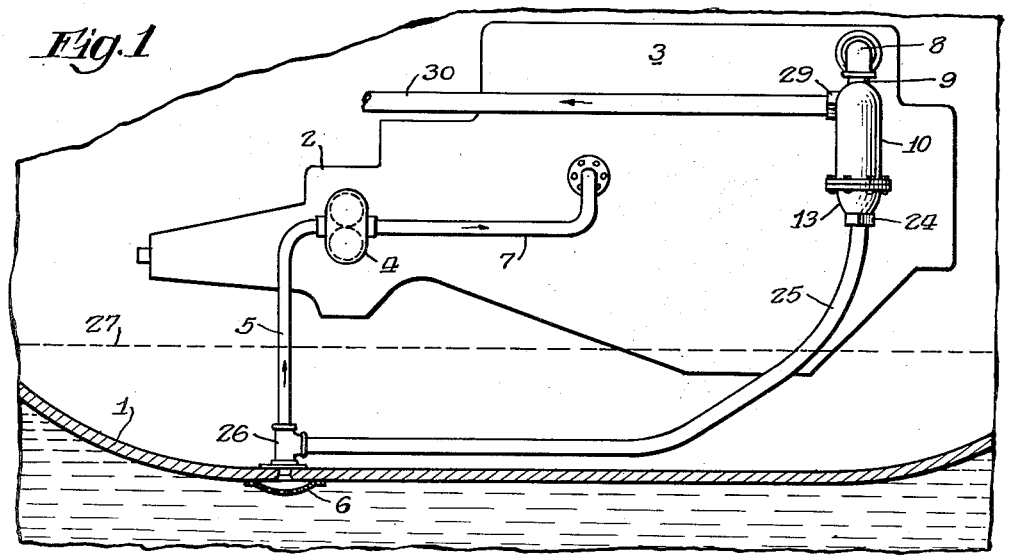
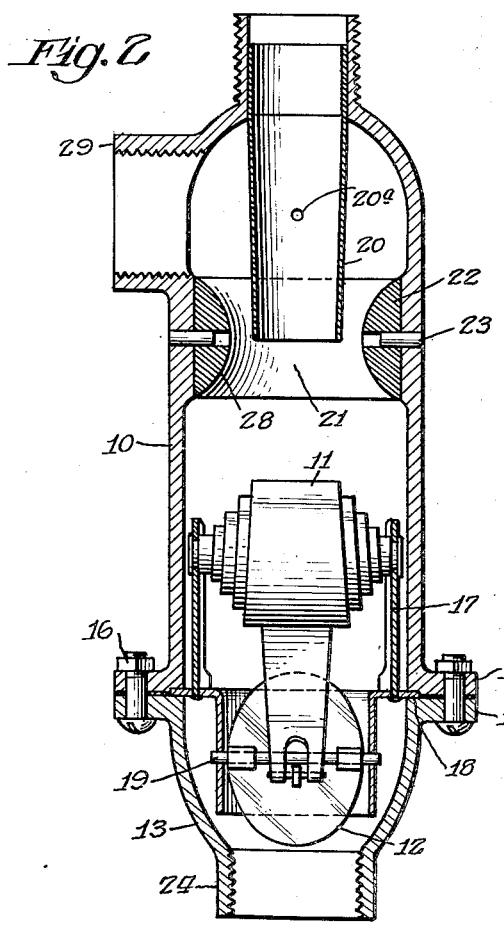
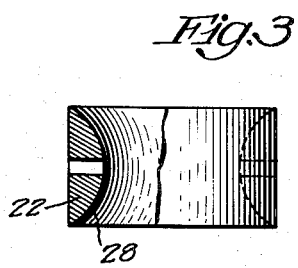
Inventor:
Harold B. Drapeau
By Parker & Carter
Attys.

Patented Aug. 24, 1943

2,327,342

UNITED STATES PATENT OFFICE 2,327,342

COOLING SYSTEM

Harold B. Drapeau, Oak Park, Ill., assignor to The Dole Valve Company, Chicago, Ill., a corporation of Illinois Application May 2, 1939, Serial No. 271,314

3 Claims. (Cl. 123—178)

This invention relates to cooling systems particularly adapted for marine engines and has for its object to provide a new and improved system of this description.

In the usual marine engines the water for cooling the engine is taken from the water in which the boat is located and forced through the engine jacket by a pump and then forced out into the water in which the boat is located. This makes it difficult to provide a thermostatically controlled system because the pressure exerted by the pump causes the thermostat to open. One of the objects of the present invention is to provide a circulatory system for marine engines by means of which a thermostat can be used and which will be free from the objections heretofore present in such systems.

The invention has further objects which are more particularly pointed out in the accompanying description.

Referring now to the drawing, Fig. 1 is a view showing one construction embodying the invention;

Fig. 2 is an enlarged sectional view through the bypass thermostat housing; and

Fig. 3 is a view showing the device for changing the area of the passageway through the bypass thermostat housing.

Like numerals refer to like parts throughout the several figures.

Referring now to the drawing, there is illustrated a section of the boat 1 in which the engine 2 is mounted. This engine is provided with a water jacket 3. There is a pump 4 which is a continuously operating, positive pressure pump, shown as a gear type pump, which pumps the water through the engine jacket. This pump is connected by an intake pipe 5 with the source of water supply in which the boat is located. There is preferably a strainer 6 connected with the end of this intake pipe. The pump 4 is connected by a pipe 7 with the engine water jacket. The water from the pump then passes through the water jacket around the cylinders. The engine jacket is provided with the discharge or water outlet 8, to which is connected a pipe 9. This pipe 9 discharges into a thermostat housing 10 which contains a thermostat 11, controlling a valve 12, which valve is normally open, but which is closed when the temperature of the engine jacket water reaches a predetermined point. This thermostat is a reverse acting thermostat, that is, instead of acting when the temperature rises to a predetermined point, to open the valve, as is usual, it acts when the temperature rises, to close the valve.

This thermostat housing preferably has a separable part or section 13. This section preferably has a flange 14 and the other part of the housing has a similar flange 15 and the two flanges are connected together by the bolts or fastening devices 16. The thermostat may be of any design or kind and for the purposes of illustration I have shown a thermostat consisting of a coil of bimetal in a casing 17, which has a flange 18 which is clamped between the flanges 14 and 15. The valve 12 is pivoted in this casing at 19.

Connected with one end of the housing 10 is a Venturi tube 20 which discharges into a Venturi passageway 21 in the housing, and which is preferably provided with a controllable vent hole 20a. Some means is provided for varying the cross sectional area of this passageway to adapt the thermostat housing for different conditions and for engines of different sizes. For this purpose there is provided a removable ring 22 which is fastened in position by the fastening devices 23 and is located opposite the discharge end of the Venturi tube 20. The Venturi tube 20 may also be varied as desired, as it is removably connected in position in the housing, so that a tube of any size or shape may be used. The ring 22 preferably has a curved inner face 28.

The main outlet 24 of the housing 10 is connected by a pipe 25 with the intake pipe 5 leading to the pump. I have shown the connection as being made by means of an elbow 24. This connection should be made to the inlet pipe 5 at a considerable distance below the water line 27 of the water in which the boat is located and preferably as far below the water line as the conditions will permit. The thermostat housing 10 and the Venturi pipe 20 and the pipe 25 form a bypass for the engine cooling water.

The thermostat housing 10 has a second outlet 29 which is located preferably opposite the Venturi pipe 20, so that the Venturi pipe 20, when the valve 12 is open, will discharge the water past it into the housing 10. This outlet 29 is connected to an overflow pipe 30 which discharges water into the body of water in which the boat is located.

It will be noted that the present invention is particularly adapted for use with internal combustion engines having no radiator, but which use water for the circulation through the engine cooling jacket.

The use and operation of my invention are as follows.

When the engine is started up, the pump 4 is started and the cool water from the body of water in which the boat is located passes up through the pump and is discharged into the engine water jacket 3 and passes around the cylinders. This water which is heated by the cylinders is then discharged through the Venturi pipe 20 and the Venturi passageway 21 and through the thermostat housing 10. Since the valve 12 is normally open, this water passes out of the outlet 24 of the thermostat housing and through the pipe 25 and enters the inlet pipe 5 and is then moved by the pump and recirculated through the engine jacket. This water then preheats the water taken by the pump from the body of water in which the boat is located. The Venturi construction insures the water being moved past the outlet 29.

When the water from the engine jacket reaches a predetermined temperature, that is preferably the effective operating temperature for the engine and the fuel, the valve 12 closes and this causes the water to pass out of the second outlet 29 and into the overflow pipe 30 so as to be discharged into the water in which the boat is located. It will be seen that under these conditions the bypass is closed so as to prevent the warm water from passing into the inlet 5, so that the pump only takes cold water from the body of water in which the boat is located and discharges it into the engine jacket. This cools the water in the engine water jacket and when it is lowered to a predetermined temperature, the venturi causes it to come into contact with the thermostat 11 and the thermostat then opens so that the warm water is then circulated through the bypass so as to preheat the water being taken by the pump from the body of water in which the boat is located.

It will be seen that there is here provided a bypass which is normally open, having connected with it an overflow discharge which is at all times open. It will further be seen that the venturi prevents the water from flowing through the overflow discharge until the temperature of the water reaches a predetermined point. At this point, the thermostat closes the valve 12 and the heated water passes out through the overflow pipe into the body of water in which the boat is located.

As the bypass pipe has considerable length and a portion of it is below the water line, this portion acts as a storage receptacle for the hot water so that there is considerable hot water ready to be mixed with the cold water from the body of water in which the boat is located. It will be seen, for example, that in cases where the pump is stopped and then started, there will be no drawing of air by the pump through either the bypass or through the connection to the body of water below the boat. Furthermore, if the pump is only stopped a comparatively short time, the water in this storage tank, that is this storage portion of the bypass, will remain hot so as to immediately temper the cold water when the pump is started up. In order to adapt the device for engines of different sizes and types and for various conditions, I am able to use the same size housing for the thermostat and valve for these different conditions. This is accomplished by providing the means for adjusting the venturi as herein shown, wherein the ring which projects into the Venturi pipe can be made of different sizes, and anyone of these sizes can be easily and quickly placed in the housing.

In view of the importance of preheating the water pumped by the pump into the engine water jacket, I prefer to provide an arrangement whereby this preheating ceases when the engine is completely warmed. This may be brought about by various means. For example, the parts may be arranged so that when the temperature of the water closes the valve 12, there will still be sufficient leakage through the valve to provide water enough to preheat the water going to the engine. This result may also be secured, for example, by using an oversize pump in the system. This oversize pump would pump more water than is really required and this would mean that the water in which the thermostat is immersed would not become hot enough to entirely close the valve, thereby providing sufficient water for preheating.

This construction also prevents an excessive build up of pressure when the thermostat is closing, because any tendency to build up pressure is immediately transferred into actual flow of water out of the bypass through the overflow pipe 30. The opening 20a in the Venturi tube is optional and when it is used, it provides a small circulation of water through overflow pipe 30, which may be connected to the exhaust pipe of the engine for the purpose of keeping the exhaust gas pipe cool and safe from fire.

I claim:

1. A cooling system for marine engines having a water jacket, comprising a positively acting pump, a pipe leading from the pump to the water in which the boat is located, a connection from the pump to the engine jacket, a bypass leading from the engine water jacket to the pipe connecting the pump with the water in which the boat is located, a thermostat housing in said bypass, a reverse acting thermostat in said housing, a valve controlled by said thermostat, but normally open while the temperature of the water in the engine jacket is being raised to an effective operating temperature, a venturi in said housing, and a continuously open overflow pipe connected with said housing between the venturi and the engine water jacket, for discharging hot water from the engine jacket into the body of water in which the boat is located.

2. A cooling system for marine engines having a water jacket, comprising a positively acting pump, a pipe leading from the pump to the water in which the boat is located, a connection from the pump to the engine water jacket, a bypass leading from the engine water jacket to the pipe connecting the pump with the water in which the boat is located, a thermostat housing in said bypass, a reverse acting thermostat therein, a valve for closing the bypass, normally open while the temperature of the water in the engine jacket is being raised to an effective operating temperature and actuated by said thermostat to close the bypass when the temperature of the water reaches an effective operating temperature, a Venturi tube projecting into said housing between the thermostat and the engine water jacket, and a projecting ring in said thermostat housing in proximity to the discharge end of said Venturi tube, by means of which the cross sectional area of the housing is reduced, a pipe connected with said bypass intermediate the engine water jacket and said venturi.

3. A cooling system for marine engines having a water jacket, comprising a positively acting pump, a pipe leading from the pump to the water in which the boat is located, a connection from the pump to the engine water jacket, a bypass leading from the engine water jacket to the pipe connecting the pump with the water in which the boat is located, a thermostat housing in said bypass, a reverse acting thermostat therein, a valve for closing the bypass, normally open while the temperature of the water in the engine jacket is being raised to an effective operating temperature and actuated by said thermostat to close the bypass when the temperature of the water reaches an effective operating temperature, a Venturi tube projecting into said housing between the thermostat and the engine water jacket, and a projecting ring in said thermostat housing in proximity to the discharge end of said Venturi tube, by means of which the cross sectional area of the housing is reduced, said projecting ring being removably connected with the housing so that the rings of various sizes may be placed in position to vary the cross sectional area of the housing, a pipe connected with said bypass intermediate the engine water jacket and said venturi.

HAROLD B. DRAPEAU.